United States Patent
Umeyama et al.

(10) Patent No.: US 10,651,460 B2
(45) Date of Patent: May 12, 2020

(54) NONAQUEOUS ELECTROLYTE SECONDARY BATTERY

(71) Applicant: TOYOTA JIDOSHA KABUSHIKI KAISHA, Toyota-shi, Aichi-ken (JP)

(72) Inventors: Hiroya Umeyama, Okazaki (JP); Keiichi Takahashi, Nishinomiya (JP); Shuji Tsutsumi, Ikoma (JP); Tatsuya Hashimoto, Osaka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 106 days.

(21) Appl. No.: 15/509,641

(22) PCT Filed: Sep. 8, 2015

(86) PCT No.: PCT/IB2015/001557
§ 371 (c)(1),
(2) Date: Mar. 8, 2017

(87) PCT Pub. No.: WO2016/038440
PCT Pub. Date: Mar. 17, 2016

(65) Prior Publication Data
US 2017/0256788 A1    Sep. 7, 2017

(30) Foreign Application Priority Data
Sep. 11, 2014  (JP) .................. 2014-185297

(51) Int. Cl.
*H01M 4/02*   (2006.01)
*H01M 4/131*  (2010.01)
(Continued)

(52) U.S. Cl.
CPC ........... *H01M 4/36* (2013.01); *H01M 2/1686* (2013.01); *H01M 4/02* (2013.01); *H01M 4/131* (2013.01);
(Continued)

(58) Field of Classification Search
CPC ...... H01M 4/131; H01M 4/362; H01M 4/505; H01M 4/525; H01M 4/5825; H01M 4/625;
(Continued)

(56) References Cited

U.S. PATENT DOCUMENTS

2006/0099495 A1\* 5/2006 Suzuki .................. H01M 2/021
429/128
2008/0318133 A1 12/2008 Matsuyama et al.
(Continued)

FOREIGN PATENT DOCUMENTS

CN     1964101 A     5/2007
CN   102906911 A     1/2013
(Continued)

*Primary Examiner* — Brittany L Raymond
(74) *Attorney, Agent, or Firm* — Oliff PLC (57) ABSTRACT

A nonaqueous electrolyte secondary battery includes a positive electrode, a negative electrode, and a separator. The positive electrode includes a positive electrode current collector, a first positive electrode mixture layer that is provided on the positive electrode current collector, and a second positive electrode mixture layer that is provided on the first positive electrode mixture layer. The first positive electrode mixture layer includes a first positive electrode active material and a first conductive material. The second positive electrode mixture layer includes a second positive electrode active material and a second conductive material. The first positive electrode active material includes a lithium composite oxide having a layered crystal structure. The second positive electrode active material includes a lithium composite phosphate having an olivine-type crystal structure. The second conductive material includes a conductive material having a higher crushing strength than the lithium composite phosphate having an olivine-type crystal structure.

14 Claims, 6 Drawing Sheets (51) Int. Cl.

| | | |
|---|---|---|
| *H01M 4/36* | (2006.01) | |
| *H01M 4/505* | (2010.01) | |
| *H01M 4/525* | (2010.01) | |
| *H01M 4/58* | (2010.01) | |
| *H01M 4/62* | (2006.01) | |
| *H01M 10/052* | (2010.01) | |
| *H01M 10/0567* | (2010.01) | |
| *H01M 10/42* | (2006.01) | |
| *H01M 2/16* | (2006.01) | |
| *H01M 10/0525* | (2010.01) | |

(52) U.S. Cl.
CPC ........... *H01M 4/362* (2013.01); *H01M 4/366* (2013.01); *H01M 4/505* (2013.01); *H01M 4/525* (2013.01); *H01M 4/5825* (2013.01); *H01M 4/625* (2013.01); *H01M 10/052* (2013.01); *H01M 10/0567* (2013.01); *H01M 10/4235* (2013.01); *H01M 10/0525* (2013.01); *H01M 2004/027* (2013.01); *H01M 2004/028* (2013.01); *H01M 2300/0025* (2013.01)

(58) Field of Classification Search
CPC ..... H01M 2004/027; H01M 2004/028; H01M 10/052; H01M 10/0525; H01M 10/0567; H01M 10/4235; H01M 2300/0025
See application file for complete search history.

(56) References Cited

U.S. PATENT DOCUMENTS

| | | | |
|---|---|---|---|
| 2011/0256454 A1* | 10/2011 | Nicolas | C04B 26/08 429/232 |
| 2013/0059199 A1 | 3/2013 | Hara et al. | |
| 2013/0155577 A1* | 6/2013 | Yang | H01M 4/133 361/502 |
| 2013/0157106 A1* | 6/2013 | Lee | H01M 2/16 429/144 |
| 2014/0363736 A1* | 12/2014 | Kim | H01M 4/131 429/220 |

FOREIGN PATENT DOCUMENTS

| | | |
|---|---|---|
| JP | 2008-198596 A | 8/2008 |
| JP | 2009-004181 A | 1/2009 |
| KR | 10-2006-0052499 A | 5/2006 |
| KR | 10-2008-0035466 A | 4/2008 |

\* cited by examiner

FIG. 1

AXIAL DIRECTION OF ELECTRODE BODY
WIDTH DIRECTION OF POSITIVE ELECTRODE
WIDTH DIRECTION OF NEGATIVE ELECTRODE

FIG. 2

AXIAL DIRECTION OF ELECTRODE BODY
WIDTH DIRECTION OF POSITIVE ELECTRODE
WIDTH DIRECTION OF NEGATIVE ELECTRODE

[TABLE 1]

| | Positive electrode mixture layer | | | | | | | | | t₂/T×100*15 (%) | t₃/T×100*16 (%) | Initial I-V resistance (mΩ) |
|---|---|---|---|---|---|---|---|---|---|---|---|---|
| | First positive electrode mixture layer | | | | Second positive electrode mixture layer | | | | | | | |
| | First positive electrode active material | Content ratio of first conductive material*11 (mass%) | | | Second positive electrode active material | | Content ratio of second conductive material*13 (mass%) | | Content ratio of LiFePO₄*14 (mass%) | | | |
| | | AB | VGCF | CNT | Material | Content ratio of LiFePO₄*12 (mass%) | Soft carbon | AB | | | | |
| Comparative Example 1 | NCM | 6 | - | - | - | - | - | - | - | - | - | 1.87 |
| Comparative Example 2 | NCM | 6 | - | - | LiFePO₄ and NCM | 50 | 0 | 6 | 10 | 20 | 6.0 | 1.64 |
| Example 1 | NCM | 6 | - | - | LiFePO₄ and NCM | 50 | 3 | 3 | 10 | 20 | 2.6 | 1.52 |

FIG. 5

[TABLE 2]

| | Positive electrode mixture layer | | | | | | | | | t₂/T×100*15 (%) | t₃/T×100*16 (%) | Initial I-V resistance (mΩ) | Capacity retention (%) | Change ratio of I-V resistance (%) |
|---|---|---|---|---|---|---|---|---|---|---|---|---|---|---|
| | First positive electrode mixture layer | | | | Second positive electrode mixture layer | | | | | | | | | |
| | First positive electrode active material | Content ratio of first conductive material*11 (mass%) | | | Second positive electrode active material | | Content ratio of second conductive material*13 (mass%) | | Content ratio of LiFePO₄*14 (mass%) | | | | | |
| | | AB | VGCF | CNT | Material | Content ratio of LiFePO₄*12 (mass%) | Soft carbon | AB | | | | | | |
| Example 1 | NCM | 6 | 0 | 0 | LiFePO₄ and NCM | 50 | 3 | 3 | 10 | 20 | 2.6 | 1.52 | 77 | 255 |
| Example 2 | NCM | 0 | 6 | 0 | LiFePO₄ and NCM | 50 | 3 | 3 | 10 | 20 | 2.6 | 1.35 | 81 | 240 |
| Example 3 | NCM | 0 | 0 | 6 | LiFePO₄ and NCM | 50 | 3 | 3 | 10 | 20 | 2.5 | 1.32 | 80 | 265 |
| Comparative Example 3 | NCM | 6 | 0 | 0 | LiFePO₄ and NCM | 50 | 0 | 6 | 10 | 20 | 6.2 | 1.34 | 76 | 225 |

FIG. 6

[TABLE 3]

| | First Positive Electrode Mixture Layer | | | | Second Positive Electrode Mixture Layer | | | | | $t_2/T \times 100$ *15 (%) | $t_3/T \times 100$ *16 (%) | Initial I-V Resistance (mΩ) | Capacity Retention (%) | Change Ratio of I-V Resistance (%) |
|---|---|---|---|---|---|---|---|---|---|---|---|---|---|---|
| | First Positive Electrode Active Material | Content Ratio of First Conductive Material *11 (mass%) | | | Second Positive Electrode Active Material | | Content Ratio of Second Conductive Material *13 (mass%) | | Content Ratio of LiFePO₄ *14 (mass%) | | | | | |
| | | AB | VGCF | CNT | Material | Content Ratio of LiFePO₄ *12 (mass%) | Soft Carbon | AB | | | | | | |
| Example 4 | NCM | 0 | 1 | 0 | LiFePO₄ and NCM | 50 | 3 | 3 | 10 | 20 | 2.6 | 1.64 | 69 | 255 |
| Example 5 | NCM | 0 | 3 | 0 | LiFePO₄ and NCM | 50 | 3 | 3 | 10 | 20 | 2.6 | 1.51 | 79 | 250 |
| Example 2 | NCM | 0 | 6 | 0 | LiFePO₄ and NCM | 50 | 3 | 3 | 10 | 20 | 2.6 | 1.35 | 81 | 240 |
| Example 6 | NCM | 0 | 10 | 0 | LiFePO₄ and NCM | 50 | 3 | 3 | 10 | 20 | 2.6 | 1.33 | 82 | 230 |
| Example 7 | NCM | 0 | 12 | 0 | LiFePO₄ and NCM | 50 | 3 | 3 | 10 | 20 | 2.7 | 1.32 | 77 | 220 |
| Example 8 | NCM | 0 | 1 | 0 | LiFePO₄ and NCM | 50 | 5 | 1 | 10 | 20 | 2.0 | 1.68 | 76 | 255 |
| Example 9 | NCM | 0 | 3 | 0 | LiFePO₄ and NCM | 50 | 5 | 1 | 10 | 20 | 2.2 | 1.53 | 81 | 260 |
| Example 10 | NCM | 0 | 6 | 0 | LiFePO₄ and NCM | 50 | 5 | 1 | 10 | 20 | 2.2 | 1.42 | 82 | 265 |
| Example 11 | NCM | 0 | 10 | 0 | LiFePO₄ and NCM | 50 | 5 | 1 | 10 | 20 | 2.3 | 1.41 | 82 | 270 |
| Example 12 | NCM | 0 | 1 | 0 | LiFePO₄ and NCM | 50 | 6 | 0 | 10 | 20 | 2.0 | 1.63 | 82 | 280 |
| Example 13 | NCM | 0 | 3 | 0 | LiFePO₄ and NCM | 50 | 6 | 0 | 10 | 20 | 2.0 | 1.58 | 83 | 250 |
| Example 14 | NCM | 0 | 6 | 0 | LiFePO₄ and NCM | 50 | 6 | 0 | 10 | 20 | 2.2 | 1.61 | 83 | 240 |
| Example 15 | NCM | 0 | 12 | 0 | LiFePO₄ and NCM | 50 | 6 | 0 | 10 | 20 | 2.2 | 1.6 | 83 | 230 |
| Example 16 | NCM | 0 | 6 | 0 | LiFePO₄ and NCM | 50 | 1 | 5 | 10 | 20 | 3.1 | 1.36 | 82 | 285 |
| Example 17 | NCM | 0 | 10 | 0 | LiFePO₄ and NCM | 50 | 1 | 5 | 10 | 20 | 3.2 | 1.37 | 82 | 290 |
| Example 18 | NCM | 0 | 0 | 1 | LiFePO₄ and NCM | 50 | 3 | 3 | 10 | 20 | 2.3 | 1.61 | 72 | 275 |
| Example 19 | NCM | 0 | 0 | 3 | LiFePO₄ and NCM | 50 | 3 | 3 | 10 | 20 | 2.3 | 1.49 | 79 | 260 |
| Example 3 | NCM | 0 | 0 | 6 | LiFePO₄ and NCM | 50 | 3 | 3 | 10 | 20 | 2.5 | 1.32 | 80 | 265 |
| Example 20 | NCM | 0 | 0 | 10 | LiFePO₄ and NCM | 50 | 3 | 3 | 10 | 20 | 2.5 | 1.3 | 80 | 270 |
| Example 21 | NCM | 0 | 0 | 12 | LiFePO₄ and NCM | 50 | 3 | 3 | 10 | 20 | 2.5 | 1.28 | 79 | 285 |

FIG. 7

[TABLE 4]

| | POSITIVE ELECTRODE MIXTURE LAYER | | | | | | | | | | | | |
|---|---|---|---|---|---|---|---|---|---|---|---|---|---|
| | FIRST POSITIVE ELECTRODE MIXTURE LAYER | | | | SECOND POSITIVE ELECTRODE MIXTURE LAYER | | | | | | | | |
| | FIRST POSITIVE ELECT-RODE ACTIVE MATERIAL | CONTENT RATIO OF FIRST CONDUCTIVE MATERIAL*11 (mass%) | | | SECOND POSITIVE ELECTRODE ACTIVE MATERIAL | | CONTENT RATIO OF SECOND CONDUCTIVE MATERIAL*13(mass%) | | CONTENT RATIO OF LiFePO$_4$*14 (mass%) | $t_2/T \times 100$*15 (%) | $t_3/T \times 100$*16 (%) | INITIAL I-V RESIS-TANCE (mΩ) | CAPACITY RETENTION (%) | CHANGE RATIO OF I-V RESIS-TANCE (%) |
| | | AB | VGCF | CNT | MATERIAL | CONTENT RATIO OF LiFePO$_4$*12 (mass%) | SOFT CARBON | AB | | | | | | |
| EXAMPLE 5 | NCM | 0 | 3 | 0 | LiFePO$_4$ and NCM | 50 | 3 | 3 | 10 | 20 | 2.6 | 1.51 | 79 | 250 |
| EXAMPLE 9 | NCM | 0 | 3 | 0 | LiFePO$_4$ and NCM | 50 | 5 | 1 | 10 | 20 | 2.2 | 1.53 | 81 | 260 |
| EXAMPLE 13 | NCM | 0 | 3 | 0 | LiFePO$_4$ and NCM | 50 | 6 | 0 | 10 | 20 | 2.0 | 1.58 | 83 | 250 |
| EXAMPLE 2 | NCM | 0 | 6 | 0 | LiFePO$_4$ and NCM | 50 | 3 | 3 | 10 | 20 | 2.6 | 1.35 | 81 | 240 |
| EXAMPLE 10 | NCM | 0 | 6 | 0 | LiFePO$_4$ and NCM | 50 | 5 | 1 | 10 | 20 | 2.2 | 1.42 | 82 | 265 |
| EXAMPLE 14 | NCM | 0 | 6 | 0 | LiFePO$_4$ and NCM | 50 | 6 | 0 | 10 | 20 | 2.2 | 1.61 | 83 | 240 |
| EXAMPLE 16 | NCM | 0 | 6 | 0 | LiFePO$_4$ and NCM | 50 | 1 | 5 | 10 | 20 | 3.1 | 1.36 | 82 | 285 |
| EXAMPLE 6 | NCM | 0 | 10 | 0 | LiFePO$_4$ and NCM | 50 | 3 | 3 | 10 | 20 | 2.6 | 1.33 | 82 | 230 |
| EXAMPLE 11 | NCM | 0 | 10 | 0 | LiFePO$_4$ and NCM | 50 | 5 | 1 | 10 | 20 | 2.3 | 1.41 | 82 | 270 |
| EXAMPLE 17 | NCM | 0 | 10 | 0 | LiFePO$_4$ and NCM | 50 | 1 | 5 | 10 | 20 | 3.2 | 1.37 | 82 | 290 |

NONAQUEOUS ELECTROLYTE SECONDARY BATTERY

BACKGROUND OF THE INVENTION

1. Field of the Invention

The present invention relates to a nonaqueous electrolyte secondary battery.

2. Description of Related Art

Japanese Patent Application Publication No. 2008-198596 (JP 2008-198596 A) discloses a configuration in which a first positive electrode mixture layer and a second positive electrode mixture layer are formed on a positive electrode current collector in this order, the first positive electrode mixture layer includes a lithium composite oxide having a layered crystal structure, and the second positive electrode mixture layer includes a lithium composite oxide having a spinel-type crystal structure or an olivine-type crystal structure. This document describes that, since the second positive electrode mixture layer is in direct contact with a nonaqueous electrolyte, safety during overcharge is improved.

SUMMARY OF THE INVENTION

When a pressure is applied to a positive electrode including two or more positive electrode mixture layers, a positive electrode active material (a positive electrode active material included in one of the positive electrode mixture layers) may be deformed or destroyed to penetrate into pores of another positive electrode mixture layer. In a portion (hereinafter, referred to as "interfacial layer") where the deformed or destroyed positive electrode active material penetrates into the pores of the other positive electrode mixture layer, the pore size or the pore volume decreases. Therefore, the amount of the nonaqueous electrolyte (retention of the nonaqueous electrolyte) present in the pores decreases, which increases the diffusion resistance of lithium ions (Lo. As a result, the internal resistance increases. According to the invention, the internal resistance of a nonaqueous electrolyte secondary battery including two or more positive electrode mixture layers can be maintained to be low.

According to an aspect of the invention, there is provided a nonaqueous electrolyte secondary battery including a positive electrode, a negative electrode, and a separator that is interposed between the positive electrode and the negative electrode. The positive electrode includes a positive electrode current collector, a first positive electrode mixture layer that is provided on the positive electrode current collector, and a second positive electrode mixture layer that is provided on the first positive electrode mixture layer to face the separator. The first positive electrode mixture layer includes a first positive electrode active material and a first conductive material. The second positive electrode mixture layer includes a second positive electrode active material and a second conductive material. The first positive electrode active material includes a lithium composite oxide having a layered crystal structure. The second positive electrode active material includes a lithium composite phosphate having an olivine-type crystal structure. The second conductive material includes a conductive material having a higher crushing strength than the lithium composite phosphate having an olivine-type crystal structure.

In the nonaqueous electrolyte secondary battery according to the aspect of the invention, the second positive electrode mixture layer includes the conductive material having a higher crushing strength than the lithium composite phosphate having an olivine-type crystal structure. As a result, even when a pressure is applied to the positive electrode according to the embodiment of the invention, the deformation or destruction of particles of the lithium composite phosphate having an olivine-type crystal structure can be prevented. Accordingly, the thickness of the interfacial layer can be reduced.

The first conductive material may include a fibrous conductive material. As a result, the electronic resistance of a contact interface between the first positive electrode mixture layer and the second positive electrode mixture layer can be suppressed to be low. The fibrous conductive material may have an aspect ratio of 20 to 100 and a total length of 1 µm to 10 µm. The first positive electrode mixture layer may include 3 mass % to 10 mass % of the fibrous conductive material. The fibrous conductive material may be vapor-grown carbon fiber (VGCF) or carbon nanotube (CNT).

The second positive electrode mixture layer may include 3 mass % to 5 mass % of the conductive material having a higher crushing strength than the lithium composite phosphate having an olivine-type crystal structure. As a result, even when a pressure is applied to the positive electrode, the deformation or destruction of particles of the lithium composite phosphate having an olivine-type crystal structure can be efficiently prevented. The conductive material having a higher crushing strength than the lithium composite phosphate having an olivine-type crystal structure may be soft carbon. The soft carbon may be any one of petroleum coke, coal coke, pitch coke, coal pitch coke, petroleum pitch coke, and polyvinyl chloride carbon. The crushing strength of the conductive material having a higher crushing strength than the lithium composite phosphate having an olivine-type crystal structure may be higher than crushing strength of the lithium composite phosphate having an olivine-type crystal structure by more than 1 time and 3 times or less.

According to the aspect of the invention, the thickness of the interfacial layer can be reduced. Therefore, the internal resistance of a nonaqueous electrolyte secondary battery including two or more positive electrode mixture layers can be maintained to be low.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a table showing a result of the change ratio of I-V resistance with respect to Examples 2 to 21.

DETAILED DESCRIPTION OF EMBODIMENTS

Hereinafter, the invention will be described with reference to the drawings. In the drawings of the invention, the same reference numeral represents the same component or the corresponding component. In addition, for the clarification and simplification of the drawings, a dimensional relationship such as length, width, thickness, or depth is appropriately deformed and does not represent an actual dimensional relationship.

[Configuration of Nonaqueous Electrolyte Secondary Battery]

Figure 1:
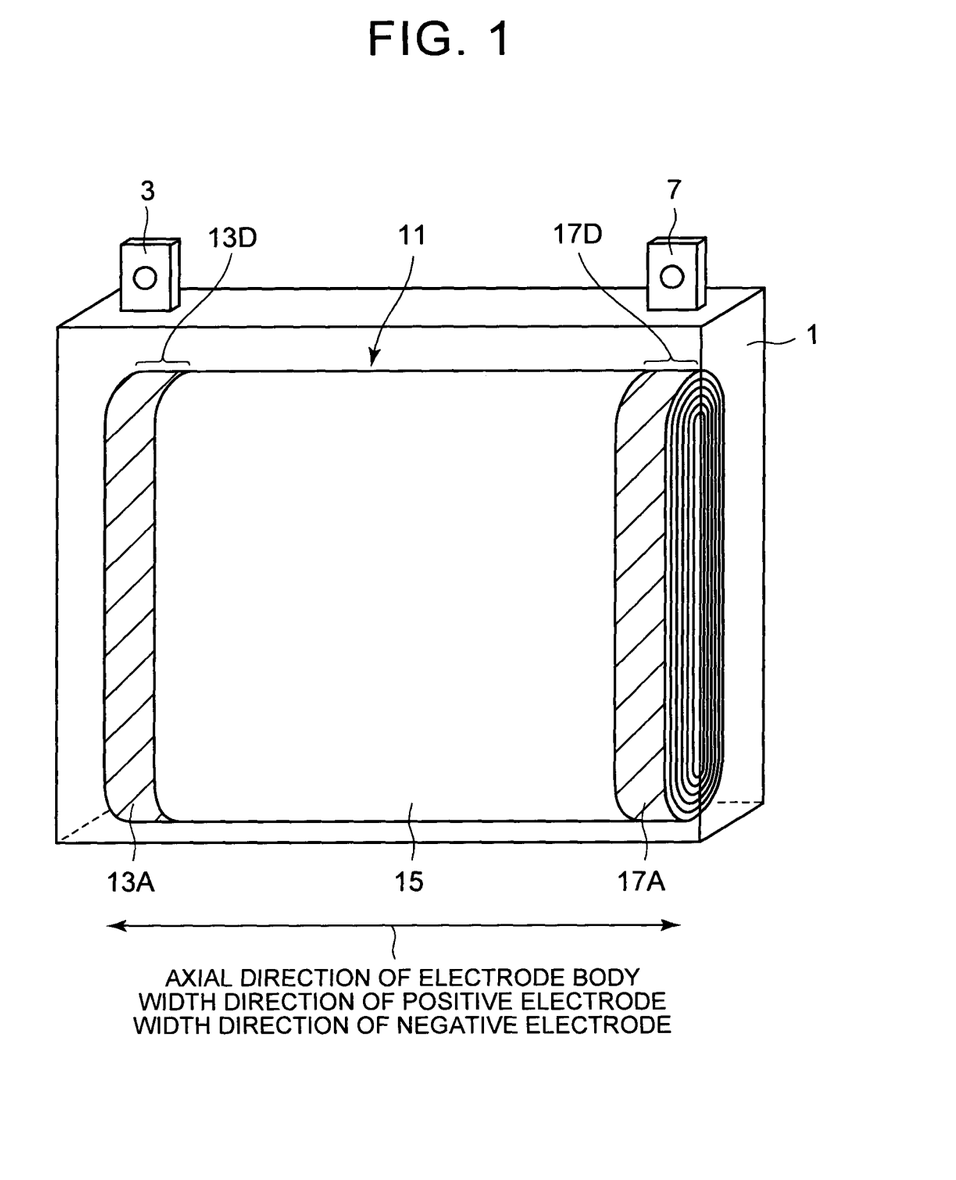
FIG. 1 is a perspective view showing a part of an internal structure of a nonaqueous electrolyte secondary battery according to an embodiment of the invention.
Figure 2:
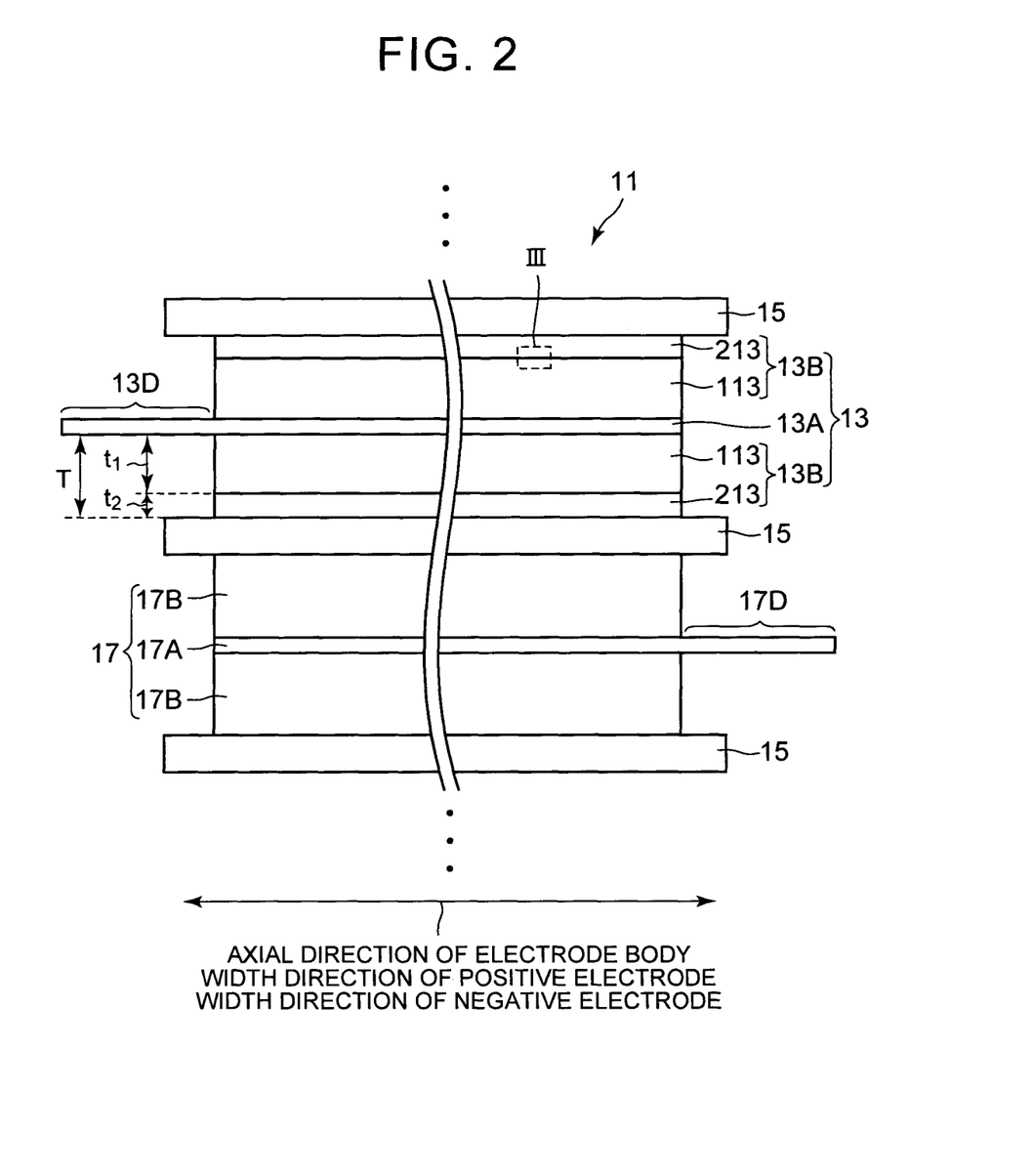
FIG. 2 is a cross-sectional view showing an electrode body according to the embodiment of the invention.
Figure 3:
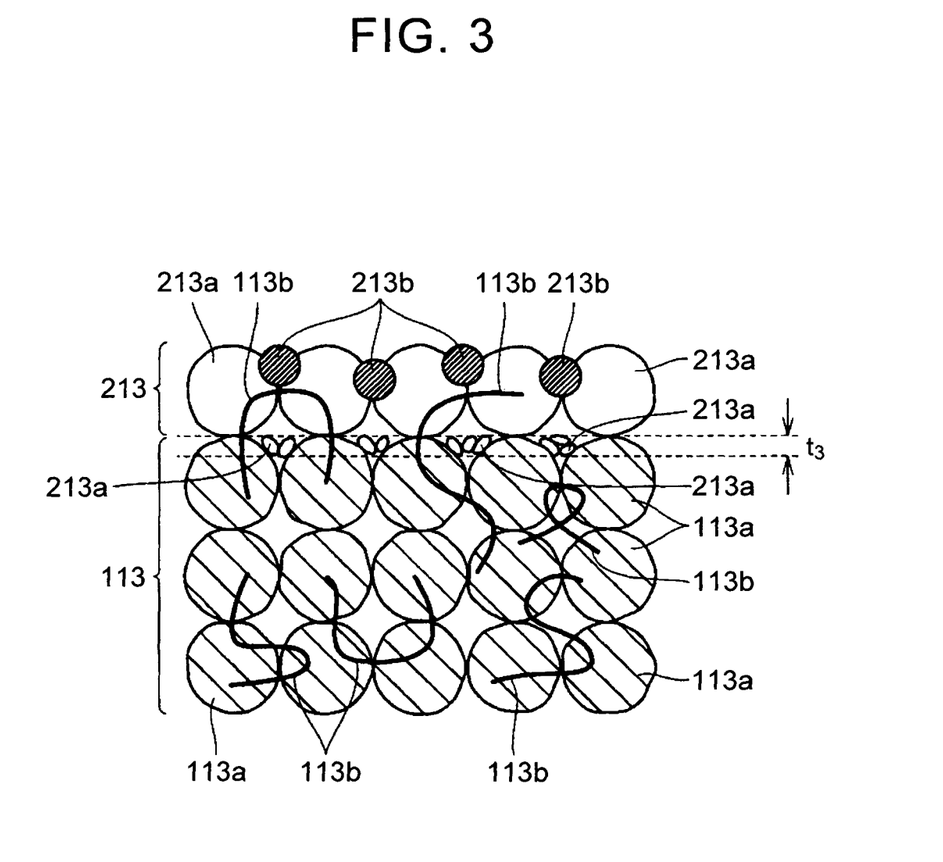
FIG. 3 is an enlarged view showing a region III of FIG. 2.

FIG. 1 is a perspective view showing a part of an internal structure of a nonaqueous electrolyte secondary battery according to an embodiment of the invention. FIG. 2 is a cross-sectional view showing an electrode body according to the embodiment of the invention. FIG. 3 is an enlarged view showing a region III of FIG. 2.

In the nonaqueous electrolyte secondary battery according to the embodiment, an electrode body 11 and a nonaqueous electrolyte (not shown) are provided in a battery case 1. In the electrode body 11, a positive electrode 13 and a negative electrode 17 are wound with a separator 15 interposed therebetween. The positive electrode 13 includes a positive electrode current collector 13A and a positive electrode mixture layer 13B that is provided on the positive electrode current collector 13A. The negative electrode 17 includes a negative electrode current collector 17A and a negative electrode mixture layer 17B that is provided on the negative electrode current collector 17A. The separator 15 is interposed between the positive electrode mixture layer 13B and the negative electrode mixture layer 17B. The nonaqueous electrolyte is stored in the positive electrode mixture layer 13B, the separator 15, and the negative electrode mixture layer 17B.

At one end of the positive electrode 13 in a width direction, the positive electrode current collector 13A is exposed without the positive electrode mixture layer 13B being provided thereon (positive electrode exposure portion 13D). At one end of the negative electrode 17 in a width direction, the negative electrode current collector 17A is exposed without the negative electrode mixture layer 17B being provided thereon (negative electrode exposure portion 17D). In the electrode body 11, the positive electrode exposure portion 13D and the negative electrode exposure portion 17D protrude from the separator 15 in opposite directions to each other toward the outside of the positive electrode 13 in the width direction (or the outside of the negative electrode 17 in the width direction). A positive electrode terminal 3 provided on the battery case 1 is connected to the positive electrode exposure portion 13D, and a negative electrode terminal 7 provided on the battery case 1 is connected to the negative electrode exposure portion 17D.

<Positive Electrode>

(First Positive Electrode Mixture Layer, Second Positive Electrode Mixture Layer)

The positive electrode mixture layer 13B includes a first positive electrode mixture layer 113 that is provided on the positive electrode current collector 13A, and a second positive electrode mixture layer 213 that is provided on the first positive electrode mixture layer 113 to face the separator 15. The first positive electrode mixture layer 113 includes a first positive electrode active material 113a, a first conductive material 113b, and a first binder (not shown). The second positive electrode mixture layer 213 includes a second positive electrode active material 213a, a second conductive material 213b, and a second binder (not shown).

The first positive electrode active material 113a includes a lithium composite oxide having a layered crystal structure and, preferably, is formed of a lithium composite oxide having a layered crystal structure. "Lithium composite oxide having a layered crystal structure" refers to a compound represented by the following formula $LiNi_aCo_bMn_cO_2$ (wherein $0<a<1$, $0<b<1$, $0<c<1$, and $a+b+c=1$) and, hereinafter, will be referred to as "NCM". "Lithium composite oxide" refers to an oxide including lithium and one or more transition metal elements.

The second positive electrode active material 213a includes a lithium composite phosphate having an olivine-type crystal structure. "Lithium composite phosphate having an olivine-type crystal structure" refers to a compound represented by the following formula $Li_xFePO_4$ (wherein $0 \leq x < 1$) and, hereinafter, will be referred to as "$LiFePO_4$".

The positive electrode mixture layer 13B includes $LiFePO_4$. Therefore, the output of the nonaqueous electrolyte secondary battery in a low SOC (for example, a SOC (state of charge) of about 20%) is higher than in a case where the positive electrode mixture layer 13B does not include $LiFePO_4$. Accordingly, the nonaqueous electrolyte secondary battery according to the embodiment is preferably used for an application (for example, as a power supply for a vehicle) where the output in a low SOC is required.

The reason why the output of the nonaqueous electrolyte secondary battery in a low SOC is high when the positive electrode mixture layer 13B includes $LiFePO_4$ is presumed to be as follows. The potential of $LiFePO_4$ during the intercalation or deintercalation of $Li^+$ is about 3.4 V. This potential corresponds to about 10% in terms of the SOC of a nonaqueous electrolyte secondary battery in which the positive electrode active material consists of only NCM. Accordingly, even when the SOC of the nonaqueous electrolyte secondary battery is low (when the SOC is about 20% or when the above-described potential corresponds to 3.5 V), a state where the $Li^+$ concentration in $LiFePO_4$ is high can be maintained. Accordingly, a state where the $Li^+$ concentration in $LiFePO_4$ particles is high can be maintained as it is. That is, the positive electrode mixture layer 13B can include the positive electrode active material having high output and high SOC. By the positive electrode mixture layer 13B including the above-described particles (positive electrode active material particles), the output of the nonaqueous electrolyte secondary battery in a low SOC increases.

In addition, since the second positive electrode mixture layer 213 includes $LiFePO_4$, most of the $LiFePO_4$ is present in the vicinity of the surface of the positive electrode mixture layer 13B facing the separator 15. As a result, the diffusion length of $Li^+$ to $LiFePO_4$ is reduced as compared to a case where $LiFePO_4$ is present in the vicinity of the positive electrode current collector 13A (for example, the first positive electrode mixture layer 113). Accordingly, the diffusion resistance of $Li^+$ can be suppressed to be low. Accordingly, it is considered that, even when the SOC of the nonaqueous electrolyte secondary battery is low, the intercalation or deintercalation of $Li^+$ to $LiFePO_4$ can be smoothly performed. Accordingly, the output of the nonaqueous electrolyte secondary battery in a low SOC increases.

The $LiFePO_4$ particles are more likely to be crushed than NCM particles. Therefore, when a pressure is applied to the positive electrode 13, for example, when an electrode (which is the positive electrode before rolling and in which the first positive electrode mixture layer and the second positive electrode mixture layer are formed on the positive electrode current collector in the order of the first positive electrode mixture layer and the second positive electrode mixture layer) is rolled to manufacture the positive electrode 13, the LiFePO$_4$ particles may be deformed or destroyed. As a result, the internal resistance of the nonaqueous electrolyte secondary battery increases. Therefore, the output of the nonaqueous electrolyte secondary battery in a low SOC may decrease irrespective of whether or not the positive electrode mixture layer 13B includes LiFePO$_4$.

However, in the embodiment, the second positive electrode mixture layer 213 includes a conductive material having a higher crushing strength than LiFePO$_4$. As a result, even when a pressure is applied to the positive electrode 13, a pressure applied to the LiFePO$_4$ particles is reduced, and thus the deformation or destruction of the LiFePO$_4$ particles can be prevented. Accordingly, the penetration of deformed or destroyed LiFePO$_4$ particles into pores of the first positive electrode mixture layer 113 can be prevented. Therefore, a thickness $t_3$ of the interfacial layer (the size of the interfacial layer in a direction perpendicular to the surface of the positive electrode current collector 13A) can be reduced.

The present inventors verified the following points based on a cross-sectional scanning electron microscope (SEM) image of the positive electrode mixture layer 13B and the analysis results of element mapping on the positive electrode mixture layer 13B. When the second positive electrode mixture layer 213 did not include the conductive material having a higher crushing strength than LiFePO$_4$, the thickness $t_3$ of the interfacial layer was about 5.5% to 6.5% with respect to a thickness T of the positive electrode mixture layer 13B. When the second positive electrode mixture layer 213 included the conductive material having a higher crushing strength than LiFePO$_4$, the thickness $t_3$ of the interfacial layer was able to be adjusted to be about 2% to 4% with respect to the thickness T of the positive electrode mixture layer 13B. Here, the thickness T of the positive electrode mixture layer 13B is the sum of a thickness $t_1$ of the first positive electrode mixture layer 113 and a thickness $t_2$ of the second positive electrode mixture layer 213. The thickness $t_1$ of the first positive electrode mixture layer 113 refers to the size of the first positive electrode mixture layer 113 in the direction perpendicular to the surface of the positive electrode current collector 13A and can be obtained using the same method as the method (the above-described method) of obtaining the thickness $t_3$ of the interfacial layer. The same shall be applied to the thickness $t_2$ of the second positive electrode mixture layer 213.

In this way, in the embodiment, the thickness $t_3$ of the interfacial layer can be suppressed to be small. Accordingly, even in a portion of the first positive electrode mixture layer 113 on the second positive electrode mixture layer 213 side, the pores through which the nonaqueous electrolyte moves can be maintained to be large. Therefore, the diffusion resistance of Li$^+$ can be suppressed to be low. Accordingly, an increase in the internal resistance can be prevented, and thus the effect obtained by the positive electrode mixture layer 13B including LiFePO$_4$ (the effect of improving the output of the nonaqueous electrolyte secondary battery in a low SOC) can be realized. Hereinafter, the second positive electrode active material 213a, the second conductive material 213b, and the first conductive material 113b will be described in this order.

(Second Positive Electrode Active Material)

The second positive electrode active material 213a includes LiFePO$_4$ and preferably includes 20 mass % to 75 mass % of LiFePO$_4$. When the second positive electrode active material 213a includes 20 mass % or more of LiFePO$_4$, the output of the nonaqueous electrolyte secondary battery in a low SOC can be further improved. When the second positive electrode active material 213a includes 75 mass % or less of LiFePO$_4$, the capacity of the nonaqueous electrolyte secondary battery can be maintained to be high. More preferably, the second positive electrode active material 213a includes 40 mass % to 60 mass % of LiFePO$_4$.

Preferably, the content of LiFePO$_4$ is 5 mass % to 20 mass % with respect to the sum of the content of the first positive electrode active material 113a and the content of the second positive electrode active material 213a. As a result, even when the first positive electrode mixture layer 113 does not include LiFePO$_4$, the input and output characteristics, battery capacity, and cycle characteristics of the nonaqueous electrolyte secondary battery can be improved. More preferably, the content of LiFePO$_4$ is 8 mass % to 15 mass % with respect to the sum of the content of the first positive electrode active material 113a and the content of the second positive electrode active material 213a. Using inductively coupled plasma (ICP) mass spectrometry, the content (mass) of LiFePO$_4$ can be obtained.

When the thickness $t_2$ of the second positive electrode mixture layer 213 is 15% to 25% with respect to the thickness T of the positive electrode mixture layer 13B, the content of LiFePO$_4$ can be adjusted to be 7.5 mass % to 20 mass % with respect to the sum of the content of the first positive electrode active material 113a and the content of the second positive electrode active material 213a. More preferably, the thickness $t_2$ of the second positive electrode mixture layer 213 is 17% to 23% with respect to the thickness T of the positive electrode mixture layer 13B.

More preferably, the second positive electrode active material 213a further includes a lithium composite oxide other than LiFePO$_4$. In this case, the second positive electrode active material 213a is a mixture of the LiFePO$_4$ particles with particles of the lithium composite oxide other than LiFePO$_4$. As the lithium composite oxide other than LiFePO$_4$, a compound which is known in the related art as a positive electrode active material for a nonaqueous electrolyte secondary battery can be used. For example, NCM can be used.

(Second Conductive Material)

The second conductive material 213b includes a conductive material having a higher crushing strength than LiFePO$_4$. "The conductive material having a higher crushing strength than LiFePO$_4$" refers to the conductive material whose crushing strength is higher than that of LiFePO$_4$ by more than 1 time to 3 times or less. The crushing strength can be measured according to JIS Z 8841-1993 (Granules and agglomerates—Test methods for strength).

Examples of the conductive material having a higher crushing strength than LiFePO$_4$ include soft carbon. In the soft carbon, carbon atoms are arranged so as to be likely to form a layered structure, and the arrangement of the carbon atoms is easily changed to the arrangement of carbon atoms in graphite by an increase in heat treatment temperature. Therefore, the soft carbon is also called graphitizable carbon, and examples thereof include petroleum coke, coal coke, pitch coke, coal pitch coke, petroleum pitch coke, and polyvinyl chloride carbon. In the soft carbon, graphitization does not progress, and slipping is not likely to occur between C—C layers unlike graphite. Therefore, the soft carbon has higher crushing strength than that of graphite particles.

Preferably, the second positive electrode mixture layer 213 includes 3 mass % to 5 mass % of the conductive material having a higher crushing strength than LiFePO$_4$. As a result, when a pressure is applied to the positive electrode 13 (for example, during the rolling of the above-described electrode), a pressure applied to the $LiFePO_4$ particles can be efficiently reduced, and thus the deformation or destruction of the $LiFePO_4$ particles can be efficiently prevented. More preferably, the second positive electrode mixture layer 213 includes 3 mass % to 5 mass % of the conductive material having a higher crushing strength than $LiFePO_4$. Here, "the second positive electrode mixture layer 213 includes 3 mass % to 5 mass % of the conductive material having a higher crushing strength than $LiFePO_4$" represents a ratio of the content (mass) of the conductive material having a higher crushing strength than $LiFePO_4$ to the mass of the second positive electrode mixture layer 213 is 3% to 5%.

Using the following method, the content (mass) of the conductive material having a higher crushing strength than $LiFePO_4$ can be obtained. First, using SEM observation, energy dispersive X-ray spectrometry (EDX), or the like, inorganic compound particles included in the second positive electrode mixture layer 213 are identified. Next, respective constituent particles of the second positive electrode mixture layer 213 are extracted, and the crushing strengths of the identified inorganic compound particles are determined using a microscopic crushing strength test. Among the identified inorganic compound particles, the composition of the positive electrode active material is obtained by ICP analysis. The content of the binder is obtained based on the F content obtained by nuclear magnetic resonance (NMR). The total content of carbon included in the second positive electrode mixture layer 213 is obtained using a combustion method. The content (mass) of the conductive material having a higher crushing strength than $LiFePO_4$ is obtained by subtracting the content of carbon used for coating the positive electrode active material and the binder from the total content of carbon.

More preferably, the second conductive material 213$b$ further includes a conductive material other than the conductive material having a higher crushing strength than $LiFePO_4$. In this case, the second conductive material 213$b$ is a mixture of the conductive material having a higher crushing strength than $LiFePO_4$ with the conductive material other than the conductive material having a higher crushing strength than $LiFePO_4$. As the conductive material other than the conductive material having a higher crushing strength than $LiFePO_4$, a compound which is known in the related art as a conductive material included in a positive electrode mixture layer for a nonaqueous electrolyte secondary battery can be used. For example, acetylene black (AB) can be used. It is preferable that the second positive electrode mixture layer 213 includes 1 mass % to 3 mass % of the conductive material other than the conductive material having a higher crushing strength than $LiFePO_4$.

(First Conductive Material)

As the first conductive material 113$b$, a compound which is known in the related art as a conductive material included in a positive electrode mixture layer for a nonaqueous electrolyte secondary battery can be used. Preferably, a fibrous conductive material can be used. As a result, when a pressure is applied to the positive electrode 13 (for example, during the rolling of the above-described electrode), the contact frequency between the first conductive material 113$b$ and the second positive electrode active material 213$a$ can be improved. Therefore, the electronic resistance (interface resistance) of a contact interface between the first positive electrode mixture layer 113 and the second positive electrode mixture layer 213 can be suppressed to be low. Accordingly, the internal resistance of the nonaqueous electrolyte secondary battery can be further suppressed to be low. Therefore, the output of the nonaqueous electrolyte secondary battery in a low SOC can be further improved.

When the interface resistance can be suppressed to be low, the input and output characteristics of the nonaqueous electrolyte secondary battery can be improved. In particular, even when the SOC of the first positive electrode mixture layer 113 is decreased before a decrease in the SOC of the second positive electrode mixture layer 213, a local potential difference between the first positive electrode mixture layer 113 and the second positive electrode mixture layer 213 can be prevented. Accordingly, even when the nonaqueous electrolyte secondary battery is repeatedly charged and discharged, the output characteristics thereof can be maintained to be high.

"The fibrous conductive material" refers to a conductive material having an aspect ratio of 20 to 100 and a total length of 1 μm to 10 μm. The aspect ratio of the fibrous conductive material refers to a ratio of the total length of the fibrous conductive material to the diameter of the fibrous conductive material. The diameter of the fibrous conductive material refers to the maximum diameter of a cross-sectional surface of the fibrous conductive material. The total length of the fibrous conductive material refers to the path length from one end of the fibrous conductive material to another end thereof in a longitudinal direction thereof. "The fibrous conductive material" may have a hollow structure or a solid structure. In "the fibrous conductive material", the size or shape of a cross-sectional surface thereof may vary in the longitudinal direction thereof. Using an intercept method, the diameter of a cross-section of the fibrous conductive material, the total length thereof, the shape thereof, and the like can be obtained. As the fibrous conductive material, for example, VGCF or CNT is preferably used.

"VGCF" refers to discontinuous carbon fiber or graphite fiber obtained using a manufacturing method (vapor growth method) of causing crystals to grow in the vapor phase. "CNT" refers to a carbon material having a shape in which one surface of graphite (graphene or graphene sheet) is rolled in a cylindrical shape. CNT may be a single-walled CNT, a multi-walled CNT, or a mixture thereof. Preferably, the multi-walled CNT has a shape in which one surface of graphite is rolled to have two or more layers.

Preferably, the first positive electrode mixture layer 113 includes 3 mass % to 10 mass % of the fibrous conductive material. As a result, the effect of further improving the output of the nonaqueous electrolyte secondary battery in a low SOC can be efficiently obtained. Even when the nonaqueous electrolyte secondary battery is repeatedly charged and discharged, the effect of maintaining the output characteristics to be high can be efficiently obtained. More preferably, the first positive electrode mixture layer 113 includes 3 mass % to 7 mass % of the fibrous conductive material. Here, "the first positive electrode mixture layer 113 includes 3 mass % to 10 mass % of the fibrous conductive material" represents that a ratio of the content (mass) of the fibrous conductive material to the mass of the first positive electrode mixture layer 113 is 3% to 10%.

The content (mass) of the fibrous conductive material can be obtained using the following method. First, using SEM observation, energy dispersive X-ray spectrometry (EDX), and the like, inorganic compound particles included in the first positive electrode mixture layer 113 are identified. Next, the fibrous conductive material is extracted from a cross-sectional SEM image, and the abundance of the fibrous conductive material is obtained by image analysis. In this way, the content (mass) of the fibrous conductive material can be obtained.

The first conductive material 113b may further include a conductive material other than the fibrous conductive material. In this case, the first conductive material 113b is a mixture of the fibrous conductive material with the conductive material other than the fibrous conductive material. As the conductive material other than the fibrous conductive material, a compound which is known in the related art as a conductive material included in a positive electrode mixture layer for a nonaqueous electrolyte secondary battery can be used. For example, acetylene black can be used.

It is preferable that the content of each of the first positive electrode active material 113a, the first conductive material 113b, and the first binder in the first positive electrode mixture layer 113 is the content which is known in the related art as the content of each of a positive electrode active material, a conductive material, and a binder in a positive electrode mixture layer for a nonaqueous electrolyte secondary battery. For example, it is preferable that the first positive electrode mixture layer 113 includes 85 mass % to 98 mass % of the first positive electrode active material 113a, 0.5 mass % to 10 mass % of the first conductive material 113b, and 0.5 mass % to 5 mass % of the first binder. The same shall be applied to the content of each of the second positive electrode active material 213a, the second conductive material 213b, and the second binder in the second positive electrode mixture layer 213.

FIG. 3 schematically shows the first positive electrode active material 113a, the first conductive material 113b, the second positive electrode active material 213a, and the second conductive material 213b. The shapes or sizes of the above components are not limited to those shown in FIG. 3.

<Negative Electrode>

The negative electrode mixture layer 17B includes a negative electrode active material and a binder. As the negative electrode active material, a material which is known in the related art as a negative electrode active material for a nonaqueous electrolyte secondary battery is preferable. The negative electrode active material is not limited to materials described below in Examples. It is preferable that the content of the negative electrode active material in the negative electrode mixture layer 17B is the content which is known in the related art as the content of a negative electrode active material in a negative electrode mixture layer for a nonaqueous electrolyte secondary battery. The content of the negative electrode active material in the negative electrode mixture layer 17B is not limited to the content described below in Examples. The same shall be applied to the binder. The negative electrode mixture layer 17B may further include a thickener.

<Separator>

It is preferable that the separator 15 has a configuration which is known in the related art as the configuration of a separator for a nonaqueous electrolyte secondary battery. The separator 15 is not limited to the configuration described below in Examples. For example, the separator may be a single layer which is formed of a porous polyolefin resin (for example, polypropylene) and may further include a heat resistance layer.

<Nonaqueous Electrolyte>

It is preferable that the nonaqueous electrolyte has a configuration which is known in the related art as the configuration of a nonaqueous electrolyte for a nonaqueous electrolyte secondary battery. The nonaqueous electrolyte is not limited to the configuration described below in Examples. For example, it is preferable that the nonaqueous electrolyte includes a lithium salt as a solute and includes a mixed solvent (including two or more organic solvents) or a gel solvent as a solvent.

Hereinafter, the invention will be described in more detail using Examples. However, the invention is not limited to the following Examples.

Example 1 and Comparative Examples 1 and 2

Example 1

<Preparation of Positive Electrode>

Powder of NCM was prepared as a first positive electrode active material. The first positive electrode active material, acetylene black, and polyvinylidene fluoride were mixed with each other at a mass ratio of 90:6:4, and the mixture was diluted with NMP (N-methylpyrrolidone). In this way, a first positive electrode mixture paste was obtained.

Figure 4:
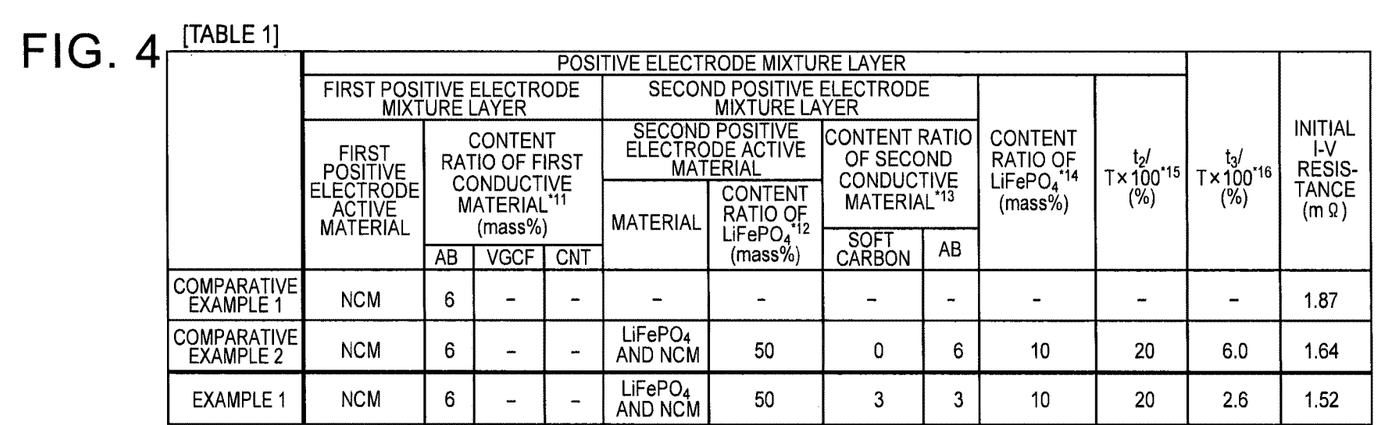
FIG. 4 is a table showing a result of the initial I-V resistance with respect to Comparative Example 1, Comparative Example 2 and Example 1.

Powder of NCM and powder of $LiFePO_4$ were mixed with each other such that a content ratio of the $LiFePO_4$ was a value shown in Table 1 of FIG. 4. In this way, a second positive electrode active material was obtained. The second positive electrode active material, acetylene black, soft carbon (conductive material having a higher crushing strength than $LiFePO_4$), and polyvinylidene fluoride were mixed with each other at a mass ratio of 90:3:3:4, and the mixture was diluted with NMP (N-methylpyrrolidone). In this way, a second positive electrode mixture paste was obtained.

The first positive electrode mixture paste and the second positive electrode mixture paste were sequentially applied to opposite surfaces of Al foil (positive electrode current collector, thickness: 15 μm) such that an end of the Al foil in a width direction thereof was exposed. The application amount of each of the first positive electrode mixture paste and the second positive electrode mixture paste was adjusted such that a thickness ratio ($t_2/T \times 100$) of the second positive electrode mixture layer was a value shown in Table 1 of FIG. 4. Next, these positive electrode mixture pastes were dried. An electrode obtained as described above was rolled using a rolling mill. In this way, a positive electrode (thickness: 120 μm, width: 117 mm, length: 6150 mm) was obtained. In the positive electrode, a positive electrode mixture layer was formed in a region of the opposite surfaces of the Al foil excluding the end of the Al foil in the width direction.

(Preparation of Negative Electrode)

A carbon material including natural graphite as a core material was prepared as a negative electrode active material. The negative electrode active material, carboxymethyl cellulose (CMC; thickener), and styrene-butadiene rubber (SBR; binder) were mixed with each other at a mass ratio of 98:1:1, and the mixture was diluted with water. In this way, a negative electrode mixture paste was obtained.

The negative electrode mixture paste was applied to opposite surfaces of Cu foil (negative electrode current collector, thickness: 10 μm) such that an end of the Cu foil in a width direction thereof was exposed. An electrode obtained as described above was rolled using a rolling mill. In this way, a negative electrode (thickness: 130 μm, width: 122 mm, length: 6300 mm) was obtained. In the negative electrode, a negative electrode mixture layer was formed in a region of the opposite surfaces of the Cu foil excluding the end of the Cu foil in the width direction.

(Preparation and Insertion of Electrode Body)

A separator (thickness: 24 μm) formed by laminating a polypropylene (PP) layer, a polyethylene (PE) layer, and a PP layer was prepared. The positive electrode, the negative electrode, and the separator are arranged such that the portion (positive electrode exposure portion) of the positive electrode mixture layer where the Al foil was exposed and the portion (negative electrode exposure portion) of the negative electrode mixture layer where the Cu foil was exposed protruded from the separator in opposite directions to each other toward the outside in the width direction of the Al foil. Next, a winding axis was arranged to be parallel to the width direction of the Al foil, and the positive electrode, the separator, and the negative electrode were wound using this winding axis. Pressures were applied to a cylindrical electrode body obtained as described above in opposite directions to obtain a flat electrode body.

Next, a battery case including a case body and a lid was prepared. A positive electrode terminal provided on the lid was connected to the positive electrode exposure portion, and a negative electrode terminal provided on the lid was connected to the negative electrode exposure portion. In this way, the lid was connected to the flat electrode body. Next, the flat electrode body was put into a concave portion of the flat electrode body, and an opening of the case body was covered with the lid.

(Preparation and Injection of Nonaqueous Electrolytic Solution Preparation)

Ethylene carbonate (EC), dimethyl carbonate (DMC), and ethyl methyl carbonate (EMC) were mixed with each other at a volume ratio of 3:3:4. LiPF6, cyclohexyl benzene (CHB), and biphenyl (BP) were added to the obtained mixed solvent. In this way, the nonaqueous electrolytic solution was obtained. In the obtained nonaqueous electrolytic solution, the concentration of LiPF6 was 0.1 mol/L, the content ratio of CHB was 2 mass %, and the content of BP was 2 mass %.

The obtained nonaqueous electrolytic solution was injected into the concave portion of the case body through a liquid injection hole formed on the lid. The internal pressure of the case body was reduced, and the liquid injection hole was sealed. In this way, a lithium ion secondary battery (design battery capacity: 25 Ah) according to Example 1 was obtained.

(Measurement of Initial I-V Resistance)

In a thermostatic chamber (set temperature: 25° C.), CC-CV (constant current-constant voltage; CV charging was cut in one hour) charging was performed on the lithium ion secondary battery according to Example 1 at a current rate (charging rate) of ⅓ C until the battery voltage reached 4.1 V. Next, at 25° C.; CC-CV (CV charging was cut in one hour) discharging was performed on the lithium ion secondary battery according to Example 1 at a current rate (discharging rate) of ⅓ C until the battery voltage reached 3 V. During the CC-CV discharging, the discharge capacity (initial discharge capacity) was measured (initial charging and discharging).

After the initial charging and discharging, CC charging (at a rate of ⅓ C) was performed on the lithium ion secondary battery in an electricity amount corresponding to 20% of the measured discharge capacity such that the SOC of the lithium ion secondary battery was adjusted to 20%. Next, at 25° C., CC charging was performed at a current corresponding to a rate of 3 C for 10 seconds. A difference ($\Delta V$) between the voltages before and after the discharging was measured. The obtained $\Delta V$ was divided by the current value to obtain "initial I-V resistance". The results are shown in Table 1 of FIG. 4.

Comparative Examples 1 and 2

A lithium ion secondary battery of Comparative Example 1 was manufactured using the method described in Example 1, except that the second positive electrode mixture layer was not formed. A lithium ion secondary battery of Comparative Example 2 was manufactured using the method described in Example 1, except that soft carbon was not used. Using the above lithium ion secondary batteries, the initial I-V resistance was obtained using the method described in Example 1. The results are shown in Table 1 of FIG. 4.

In Table 1, "Content Ratio of First Conductive Material[*11]" represents the ratio of the content (mass) of the first conductive material to the mass of the first positive electrode mixture layer. "Content Ratio of LiFePO$_4$[*12]" represents the ratio of the mass of LiFePO$_4$ to the mass of the second positive electrode active material. "Content Ratio of Second Conductive Material[*13]" represents the ratio of the content (mass) of the second conductive material to the mass of the second positive electrode mixture layer. "Content Ratio of LiFePO$_4$[*14]" represents the ratio (mass ratio) of the content of LiFePO$_4$ to the sum the content of the first positive electrode active material and the content of the second positive electrode active material. "$t_2/T \times 100$[*15]" represents the ratio of the thickness $t_2$ of t second positive electrode mixture layer to the thickness T of the positive electrode mixture layer. "$t_3/T \times 100$[*16]" represents the ratio of the thickness $t_3$ of the interfacial layer to the thickness T of the positive electrode mixture layer. "AB" represents acetylene black. The same shall be applied to Tables 2 to 4.

In Comparative Example 2 in which the positive electrode mixture layer included LiFePO$_4$, the initial I-V resistance was lower than that of Comparative Example 1 in which the positive electrode mixture layer did not include LiFePO$_4$. It was found from the results that, when LiFePO$_4$ is used, the initial I-V resistance can be reduced.

However, in Example 1 in which the second positive electrode mixture layer included soft carbon, the initial I-V resistance was even lower than that of Comparative Example 2 in which the second positive electrode mixture layer did not include soft carbon. In Example 1, the thickness $t_3$ of the interfacial layer was less than that of Comparative Example 2. It was found from the above results that, when the second positive electrode mixture layer includes soft carbon, the thickness $t_3$ of the interfacial layer can be reduced, and the initial I-V resistance can be further reduced.

Examples 1 to 3 and Comparative Example 3

Examples 2 and 3 and Comparative Example 3

A lithium ion secondary battery of Example 2 was manufactured using the method described in Example 1, except that VGCF was used as the first conductive material instead of acetylene black. A lithium ion secondary battery of Example 3 was manufactured using the method described in Example 1, except that CNT was used as the first conductive material instead of acetylene black. A lithium ion secondary battery of Comparative Example 3 was manufactured using the method described in Comparative Example 2, except that VGCF was used as the first conductive material instead of acetylene black.

(Initial I-V Resistance, Capacity Retention, Change Ratio of I-V Resistance)

Using the method described in Example 1, the initial discharge capacity was measured, and the initial I-V resistance was measured. The results are shown in Table 2 of FIG. 5.

After the initial charging and discharging, a cycle test was performed on the lithium ion secondary battery. In the cycle test, at 60° C., at a current rate of 2 C, the following operations were repeated 500 times: "constant current charging was performed until the battery voltage reached 4.1 V; the operation was stopped for 10 minutes; and constant current discharging was performed until the battery voltage reached 3.0 V". After the cycle test, the discharge capacity (discharge capacity after the cycles) of the lithium ion secondary battery was measured using the same measurement method as that of the initial discharge capacity. Using the following Equation 1, the capacity retention was calculated. The results are shown in Table 2 of FIG. 5. It can be said that, the higher the capacity retention, the higher the performance of the lithium ion secondary battery.

Figure 5:
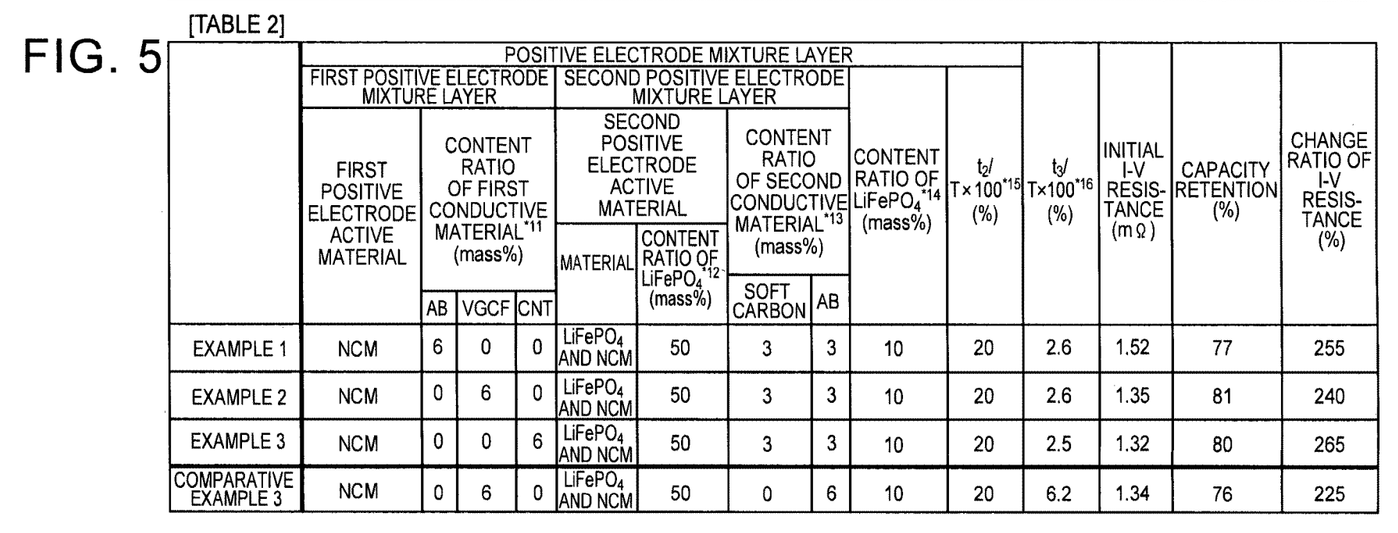
FIG. 5 is a table showing a result of the change ratio of I-V resistance with respect to Examples 1 to 3 and Comparative Example 3.

(Capacity Retention)=(Discharge Capacity after Cycles)/(initial discharge capacity)×100    Equation 1

After the cycle test, the I-V resistance (I-V resistance after the cycles) of the lithium ion secondary battery was measured using the same measurement method as that of the initial I-V resistance. Using the following Equation 2 the change ratio of I-V resistance was calculated. The results are shown in Table 2 of FIG. 5. It can be said that, the lower the change ratio of I-V resistance, the higher the performance of the lithium ion secondary battery.

(Change Ratio of I-V Resistance)={(I-V Resistance after Cycles)−(Initial I-V Resistance)}/(Initial I-V Resistance)×100    Equation 2

In Example 2, the initial I-V resistance was lower, the capacity retention was higher, and the change ratio of I-V resistance was lower than those of Example 1. In Example 3, the initial I-V resistance was lower, and the capacity retention was higher than those of Example 1. It was found from the results that, when VGCF or CNT was used as the first conductive material, the initial I-V resistance can be further reduced, and the capacity retention can be increased.

There was no significant difference in the thickness $t_3$ of the interfacial layer between Comparative Example 2 (Table 1) and Comparative Example 3. However, in Example 2, the thickness $t_3$ of the interfacial layer was less than that of Comparative Example 3. From the above results, the following points were found: the thickness $t_3$ of the interfacial layer cannot be reduced only by the use of VGCF or CNT as the first conductive material; and it is preferable that the second conductive material includes soft carbon in order to reduce the thickness $t_3$ of the interfacial layer.

Examples 2 to 21

Examples 2, 4 to 7

Lithium ion secondary batteries of Examples 4 to 7 were manufactured using the method described in Example 2, except that the content ratio of VGCF was changed to the value shown in Table 3 of FIG. 6. Next, the initial I-V resistance, the capacity retention, and the change ratio of I-V resistance were obtained using the method described in Examples 2 and 3. The results are shown in Table 3 of FIG. 6.

In Examples 2, 5, and 6, the initial I-V resistance was even lower, and the capacity retention was even higher than those of Example 4. In Examples 2, 5, and 6, the capacity retention was even higher than that of Example 7. It was found from the results that the content ratio of VGCF is preferably 3 mass % to 10 mass %.

Examples 8 to 17

Lithium ion secondary batteries of Examples 8 to 17 were manufactured using the method described in Example 2, except that the content ratio of VGCF, the content ratio of soft carbon, and the content ratio of acetylene black were changed to the values shown in Table 3 of FIG. 6. Next, the initial I-V resistance, the capacity retention, and the change ratio of I-V resistance were obtained using the method described in Examples 2 and 3. The results are shown in Table 3 of FIG. 6.

In Examples 9 to 11, the initial I-V resistance was even lower, and the capacity retention was even higher than those of Example 8. In Examples 13 to 15, the initial I-V resistance was even lower, the capacity retention was even higher, and the change ratio of I-V resistance was even lower than those of Example 12. In Examples 16 and 17, the initial I-V resistance was extremely low. It was found from the results that the content ratio of VGCF is preferably 3 mass % to 10 mass %.

Examples 3, 18 to 21

Lithium ion secondary batteries of Examples 18 to 21 were manufactured using the method described in Example 3, except that the content ratio of CNT was changed to the value shown in Table 3 of FIG. 6. Next, the initial I-V resistance, the capacity retention, and the change ratio of I-V resistance were obtained using the method described in Examples 2 and 3. The results are shown in Table 3 of FIG. 6.

In Examples 3, 19, and 20, the initial I-V resistance was even lower, the capacity retention was even higher, and the change ratio of I-V resistance was even lower than those of Example 18. In Examples 3, 19, and 20, the change ratio of I-V resistance was even lower than that of Example 21. It was found from the results that the content ratio of CNT is preferably 3 mass % to 10 mass %.

<Content Ratio of Soft Carbon>

Figure 7:
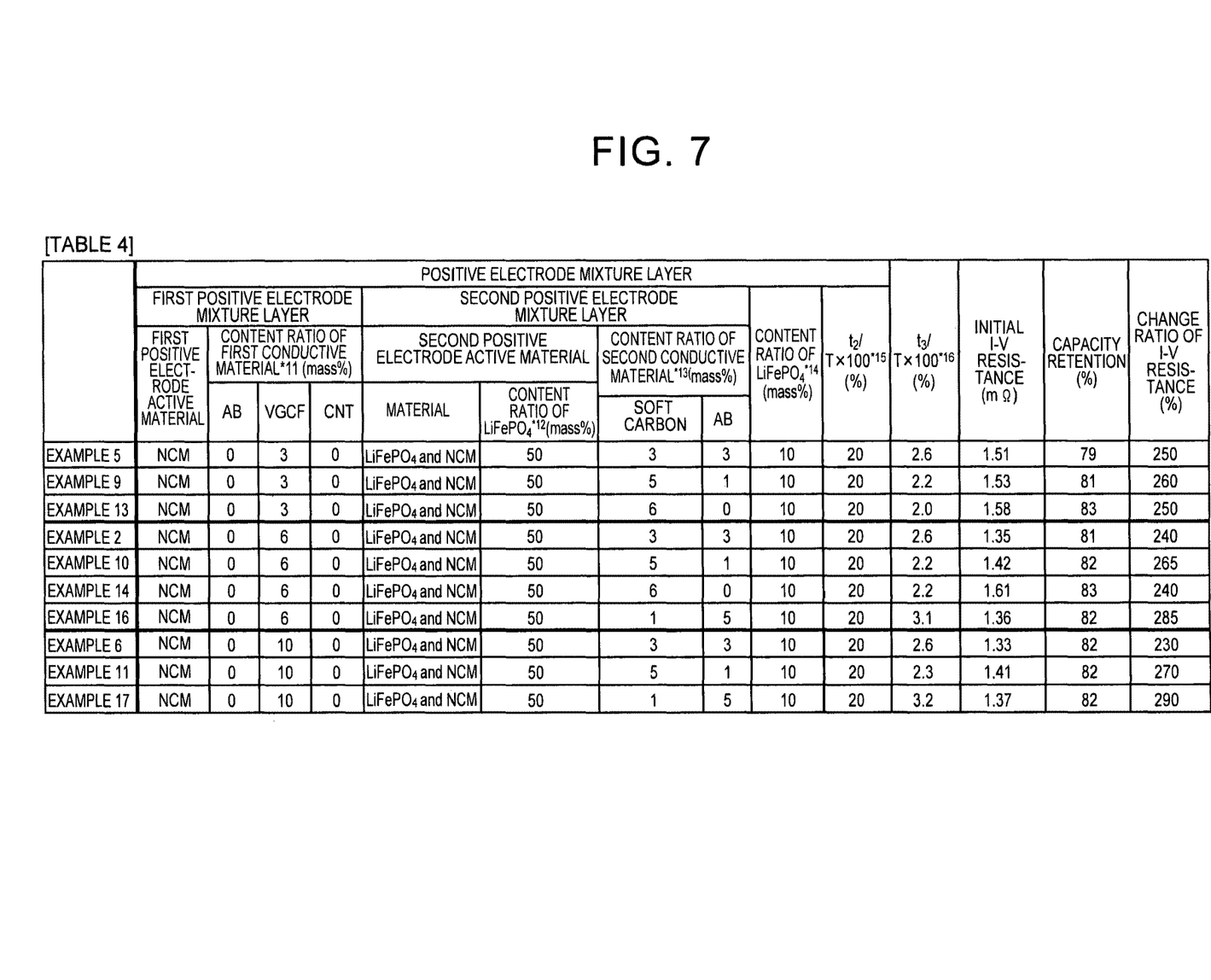
FIG. 7 is a table showing results of the initial I-V resistance, the capacity retention, and the change ratio of I-V resistance with respect to Examples 2, 5, 6, 9, 10, 11, 13, 14, 16 and 17.

As shown in Table 4 of FIG. 7, in Examples 5 and 9, the initial resistance was even lower than that of Example 13. In Examples 2 and 10, the initial I-V resistance was even lower than that of Example 14, and the change ratio of resistance was even lower than that of Example 16. In Examples 6 and 11, the change ratio of I-V resistance was even lower than that of Example 17. It was found from the results that the content ratio of soft carbon is preferably 3 mass % to 5 mass %.

The embodiment and Examples disclosed herein are merely exemplary in all respects and are not particularly limited. The scope of the invention is defined not by the above description but by claims, and equivalent meanings to claims and all the changes within claims are intended to be embraced therein.

For example, in the formula $LiNi_aCo_bMn_cO_2$ representing NCM, it is preferable that a, b, and c satisfy $0.2<a<0.4$, $0.2<b<0.4$, and $0.2<c<0.4$, and it is more preferable that a, b, and c satisfy $0.3<a<0.35$, $0.3<b<0.35$, and $0.3<c<0.35$. NCM may be doped with a different element and examples of the different element include magnesium (Mg), silicon (Si), calcium (Ca), titanium (Ti), vanadium (V), chromium (Cr), zinc (Zn), gallium (Ga), zirconium (Zr), niobium (Nb), molybdenum (Mo), tin (Sn), hafnium (Hf), and tungsten (W).

In $LiFePO_4$, a portion of iron (Fe) may be substituted with an element other than iron (for example, cobalt (Co), manganese (Mn) or nickel (Ni)). $LiFePO_4$ may be doped with the different element. At least a part of surfaces of particles (secondary particles) of $LiFePO_4$ may be coated with a carbon material.

In the electrode body, the positive electrode and the negative electrode may be laminated with the separator interposed therebetween.

What is claimed is:

1. A nonaqueous electrolyte secondary battery comprising:
    a positive electrode;
    a negative electrode; and
    a separator that is interposed between the positive electrode and the negative electrode, wherein
    the positive electrode comprises a positive electrode current collector, a first positive electrode mixture layer that is provided on the positive electrode current collector, and a second positive electrode mixture layer that is provided on the first positive electrode mixture layer to face the separator,
    the first positive electrode mixture layer comprises a first positive electrode active material and a first conductive material,
    the second positive electrode mixture layer comprises a second positive electrode active material and a second conductive material,
    the first positive electrode active material comprises a lithium composite oxide having a layered crystal structure,
    the second positive electrode active material is a mixture of a lithium composite oxide having a layered crystal structure and a lithium composite phosphate having an olivine-type crystal structure,
    the second conductive material comprises a conductive material having a crushing strength that is more than 1 time and 3 times or less higher than the lithium composite phosphate having the olivine-type crystal structure,
    the crushing strength is measured according to JIS Z 8841-1993, and
    the second positive electrode active material consists of $LiFePO_4$ as the lithium composite phosphate having the olivine-type crystal structure in an amount of 20 mass % to 75 mass % of an entire weight of the second positive electrode active material and the lithium composite oxide having the layered crystal structure as the rest of the weight of the second positive electrode active material.

2. The nonaqueous electrolyte secondary battery according to claim 1, wherein
    the first conductive material comprises a fibrous conductive material.

3. The nonaqueous electrolyte secondary battery according to claim 2, wherein
    the fibrous conductive material has an aspect ratio of 20 to 100 and a total length of 1 μm to 10 μm.

4. The nonaqueous electrolyte secondary battery according to claim 2, wherein
    the first positive electrode mixture layer comprises 3 mass % to 10 mass % of the fibrous conductive material.

5. The nonaqueous electrolyte secondary battery according to claim 2, wherein
    the fibrous conductive material is vapor-grown carbon fiber or carbon nanotube.

6. The nonaqueous electrolyte secondary battery according to claim 1, wherein
    the second positive electrode mixture layer comprises 3 mass % to 5 mass % of the conductive material having the higher crushing strength than the lithium composite phosphate having the olivine-type crystal structure.

7. The nonaqueous electrolyte secondary battery according to claim 1, wherein
    the conductive material having the higher crushing strength than the lithium composite phosphate having the olivine-type crystal structure is soft carbon.

8. The nonaqueous electrolyte secondary battery according to claim 7, wherein
    the soft carbon is any one of petroleum coke, coal coke, pitch coke, coal pitch coke, petroleum pitch coke, and polyvinyl chloride carbon.

9. The nonaqueous electrolyte secondary battery according to claim 1, wherein
    a thickness of the second positive electrode mixture layer is 15% to 25% with respect to a sum of a thickness of the first positive electrode mixture layer and the thickness of the second positive electrode mixture layer.

10. The nonaqueous electrolyte secondary battery according to claim 1, wherein
    the second conductive material further comprises a conductive material other than the conductive material having the higher crushing strength in an amount of from 1 mass % to 3 mass % with respect to the total mass of the second positive electrode mixture layer.

11. The nonaqueous electrolyte secondary battery according to claim 1, wherein
    the first positive electrode mixture layer comprises pores.

12. The nonaqueous electrolyte secondary battery according to claim 1, wherein a thickness of an interfacial layer, the interfacial layer being deformed or destroyed first positive electrode active material that penetrates into pores of the second positive electrode mixture layer, or deformed or destroyed second positive electrode active material that penetrates into pores of the first positive electrode mixture layer, is in a range of from 2% to 4% with respect to a sum of a thickness of the first positive electrode mixture layer and the thickness of the second positive electrode mixture layer.

13. A nonaqueous electrolyte secondary battery comprising:
    a positive electrode;
    a negative electrode; and
    a separator that is interposed between the positive electrode and the negative electrode, wherein
    the positive electrode comprises a positive electrode current collector, a first positive electrode mixture layer that is provided on the positive electrode current collector, and a second positive electrode mixture layer that is provided on the first positive electrode mixture layer to face the separator,
    the first positive electrode mixture layer comprises a first positive electrode active material and a first conductive material,
    the second positive electrode mixture layer comprises a second positive electrode active material and a second conductive material,
    the first positive electrode active material comprises a lithium composite oxide having a layered crystal structure,
    the second positive electrode active material consists of $LiFePO_4$ as a lithium composite phosphate having an olivine-type crystal structure in an amount of 20 mass % to 75 mass % of an entire weight of the second positive electrode active material and a lithium composite oxide having a layered crystal structure as the rest of the weight of the second positive electrode active material,
    the second conductive material comprises a conductive material having a crushing strength that is more than 1 time and 3 times or less higher than the lithium composite phosphate having the olivine-type crystal structure, and the crushing strength is measured according to JIS Z 8841-1993.

14. A nonaqueous electrolyte secondary battery comprising:
- a positive electrode;
- a negative electrode; and
- a separator that is interposed between the positive electrode and the negative electrode, wherein the positive electrode comprises a positive electrode current collector, a first positive electrode mixture layer that is provided on the positive electrode current collector, and a second positive electrode mixture layer that is provided on the first positive electrode mixture layer to face the separator, the first positive electrode mixture layer comprises a first positive electrode active material and a first conductive material, the second positive electrode mixture layer comprises a second positive electrode active material and a second conductive material, the first positive electrode active material comprises a lithium composite oxide having a layered crystal structure, the second positive electrode active material consists of $LiFePO_4$ as a lithium composite phosphate having an olivine-type crystal structure in an amount of 20 mass % to 75 mass % of an entire weight of the second positive electrode active material and a lithium composite oxide having a layered crystal structure as the rest of the weight of the second positive electrode active material, the second conductive material comprises a conductive material having a crushing strength that is more than 1 time and 3 times or less higher than the lithium composite phosphate having the olivine-type crystal structure, the crushing strength is measured according to JIS Z 8841-1993, and a content of the $LiFePO_4$ is 5 mass % to 20 mass % with respect to a sum of a content of the first positive electrode active material and a content of the second positive electrode active material.

* * * * *